Sept. 19, 1961     J. HALES     3,000,622
LIQUID SPRINGS
Filed April 17, 1959
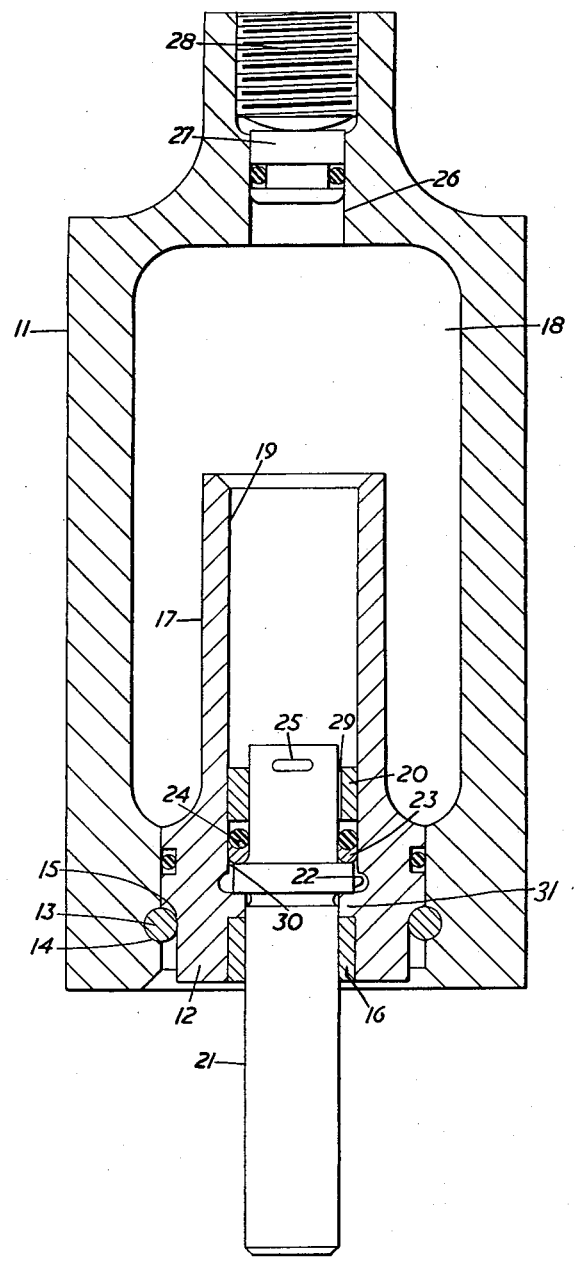
INVENTOR
JOHN HALES
BY Reynolds, Beach &
Christensen
ATTORNEYS

United States Patent Office 3,000,622
Patented Sept. 19, 1961

3,000,622
LIQUID SPRINGS
John Hales, Hatherley, Cheltenham, England, assignor to Dowty Rotol Limited, a British company
Filed Apr. 17, 1959, Ser. No. 807,163
Claims priority, application Great Britain Apr. 22, 1958
3 Claims. (Cl. 267—1)

This invention relates to liquid springs, that is, a resilient device comprising a rigidly enclosed body of liquid wherein the entry of a plunger is resisted by the compressibility of the liquid.

Such springs have until now been mainly used as shock absorbers for aircraft undercarriages, and it will be realized that for this purpose a liquid spring is only called upon to give service for short periods between which are long intervals of time.

The present invention is particularly, though not exclusively, concerned with liquid springs intended for industrial use in which such springs may be called upon to withstand a large number of applied loads over repeated or long-continued periods of use, and the main object of the invention is to provide a construction giving prolonged life with a minimum of wear over the bearing surfaces, which naturally must fit liquid-tightly whilst resisting high pressure.

According to the invention, a liquid spring comprises a pressure vessel whose walls are adequately thick and strong, wholly filled with compressible liquid, an end wall of the vessel having an opening therein constituted by a cylindrical outer bearing surface and axially inwardly therefrom a coaxial bore of larger diameter than that of the outer bearing surface, a plunger extending through the outer bearing surface in slidable engagement therewith, a cylindrical inner bearing surface on the inner end portion of the plunger forming a movable inner bearing which slidably engages the larger bore, a liquid sealing packing mounted on the plunger axially outwardly of said inner end portion and slidably engaging said bore, but accessible to contained liquid through a passage past the movable inner bearing, and a radial flange formed on the plunger axially outwardly of the sealing packing, said flange terminating short of said bore to provide a clearance, closed by the sealing packing, whereby the sealing packing and the inner bearing disposed inwardly thereof alone engage said bore. Thus the bore, which is engaged by the seal, receives only the inner bearing which, lying axially inwardly of the seal and accessible to the liquid by way of the passage referred to, is wholly lubricated by the hydraulic liquid. Moreover, the flange on the plunger engages a radially inwardly directed flange 31 within the axially outer end of the bore, to constitute a positive out-stop limiting outward movement of the plunger under the influence of pressure within the vessel.

The invention is illustrated in the accompanying axial sectional drawing wherein a thick-walled cylinder 11 is closed at one end by an end wall formed as a plug 12. The plug 12 is secured against outward movement by a circlip 13 which is let into a groove 14 formed in the cylinder to engage a shoulder 15 formed on the end plug 12. The end plug 12 has an opening fitted with a bearing bush 16 of suitable material such as Phosphor bronze or even a synthetic material such as nylon. This is the outer bearing referred to above, and leads into a co-axial bore 19 of greater diameter which extends uniformly within a skirt portion 17 forming an inner extension of the plug 12.

The bore 19 of the skirt 17 is slidably engaged by a sleeve 20 which is mounted on the inner end of a plunger 21 to form the inner bearing. The sleeve 20 may be of the same material as the bush 16.

The plunger enters the fixed outer bearing 16 and inwardly thereof is enlarged by a radial flange 22 which, however, is of lesser diameter than the bore 19 so as to provide a clearance 30. The flange supports a back-up ring 23 of a tough material such as nylon which will not wear the bore 19 appreciably yet is capable of supporting a sealing ring 24 of a softer resilient material from extrusion into the clearance 30 between the flange 22 and the bore 19. The axial length of the bearing sleeve 20 is larger than that of the liquid sealing packing constituted by the back-up ring 23 and sealing ring 24.

The sealing ring 24, which may be of solid circular cross-section, is inwardly confined though with some axial clearance by the bearing sleeve 20, and the latter is in turn retained on the plunger 21, with which it moves, for example, by means of a split pin 25. A liquid passage is provided for contained liquid to reach the outer end of the sleeve 20. This may take any suitable form, and by way of example a longitudinal groove 29 may be provided between the sleeve 20 and the inner end of the plunger 21, to equalize the pressure between the chamber 18 and the clearance in the front of the sealing ring 24, and to assure access of the liquid in the cylinder as a lubricant between the sleeve 20 and bore 19.

The opposite end of the pressure vessel 11 has a charging opening 26 which is sealingly engaged by a slidable plug 27 whose position may be set by a screw plug 28.

In a high pressure device where a constantly sliding seal is exposed to high pressure, the eventual failure of the seal is normally due to abrasion by any roughness which may be present on the surface against which it bears. The present invention stems from the realization that such roughness can arise by sliding engagement of a hard bearing material in the unlubricated condition. Thus, if the flange 22, being isolated from the contained liquid by the sealing ring 24, were of a diameter to engage slidably the bore 19 it would inevitably produce fine scratches or roughness on the bore 19 which during repeated use would damage the sealing ring 24. Similar results might follow if the sleeve 20 had access to the liquid at its inner end only, and were unlubricated by the liquid at its outer end.

It may be seen that according to the present construction the flange 22 cannot engage the bore 19 and, apart from the back-up ring 23 which is of a tough though sufficiently soft material not to damage the bore 19, the inner bearing 20 is wholly disposed on the liquid-contained side of the sealing ring 24, the liquid has free access between sleeve 20 and bore 19, and the bearing is therefore continuously lubricated. Also, the out-stopping of the plunger is effected by contact of the flanges 31 and 22, each of which being non-compressible, avoids the creation of a high initial friction such as would be created were one such stop compressible.

I claim as my invention:

1. A liquid spring comprising a non-deformable pressure vessel wholly filled with compressible liquid, an end wall of the vessel having an opening therein, a cylindrical bearing bushing received in the outer end of said opening, a radially inwardly directed flange on the vessel located in said opening axially inwardly of said bushing, a coaxial bore of larger diameter than that of the outer bearing bushing, located axially inwardly of said flange, a plunger extending through the outer bearing bushing in slidable engagement therewith, a radial flange formed on and directed outwardly from the plunger, at a location axially inwardly of the inwardly directed flange, said flange on the plunger terminating radially short of the bore of larger diameter, an axially inner end portion of the plunger extending inwardly beyond the flange upon the plunger and spaced radially inwardly of the bore, a liquid sealing packing mounted on the plunger inwardly of and against the flange thereon to engage said bore of larger diameter and the inner end portion of the plunger, and a cylindrical inner bearing sleeve mounted upon and slidable axially with the inner end portion of the plunger, forming a movable inner bearing which slidably engages said bore of larger diameter axially inwardly of the liquid sealing packing, said bearing sleeve being formed with a liquid passage from end to end, for continuous lubrication of the bore intermediate the sleeve and the liquid sealing packing by the liquid which fills the pressure vessel, said movable inner bearing sleeve also confining the liquid sealing packing.

2. A liquid spring comprising a non-deformable pressure vessel wholly filled with compressible liquid, an end wall of the vessel having an opening therein defining an axially outer bearing surface, a radially inwardly directed flange, and an axially inward bore of larger diameter than said outer bearing surface, a plunger having an outer end portion in slidable engagement with said outer bearing surface, a radially outwardly directed flange located axially inwardly of and engageable with said inwardly directed flange, and an axially inner end portion extending beyond its flange and spaced radially inwardly of said bore, a liquid sealing packing resting upon the plunger's flange, intermediate the inner end portion of the plunger and the bore, a cylindrical inner bearing ring intermediate the inner end portion of the plunger and the bore, located axially inwardly of the packing, said inner bearing ring having a longitudinal passage from end to end to freely equalize liquid pressure between the spaces located beyond such ends.

3. A liquid spring comprising a non-deformable pressure vessel wholly filled with compressible liquid, an end wall of the vessel having an opening therein, a cylindrical bearing bushing received in the outer end of said opening, a bore coaxial with said opening and bearing bushing and located axially inwardly of the latter, and of larger diameter than said bushing, a plunger extending through and guided in said bushing, a radially outwardly directed flange on the plunger located axially inwardly of the bushing, but spaced radially from the wall of said bore, an axially inner end portion of the plunger extending axially inwardly beyond said flange, a cylindrical inner bearing element upon and movable with the inner end portion of the plunger, bearing against the bore wall, and spaced axially inwardly of the flange, a liquid sealing packing received in the space between the flange and the inner bearing element, and sealing between the inner end portion of the plunger and the bore wall, said movable inner bearing element having an axial length greater than that of the liquid sealing packing, and longitudinal passage means extending from one end to the other of the movable inner bearing to assure access of liquid in the cylinder as a lubricant between the inner bearing and the bore wall, within the space intermediate the liquid sealing packing and said inner bearing.

References Cited in the file of this patent

UNITED STATES PATENTS

| | | |
|---|---|---|
| 2,437,586 | Aber | Mar. 9, 1948 |
| 2,494,598 | Waring | Jan. 17, 1950 |
| 2,708,573 | Rovoldt | May 17, 1955 |
| 2,729,440 | Wales | Jan. 3, 1956 |
| 2,740,625 | Taylor | Apr. 3, 1956 |